3,377,982
DEVICE FOR DETECTING THE PRESENCE OR
ABSENCE OF FILM IN MOVIE CAMERAS
Yoshihisa Katsuyama, Yokohama-shi, Japan, assignor to
Nippon Kogaku K.K., Tokyo, Japan, a corporation of
Japan
Filed Sept. 13, 1966, Ser. No. 579,155
Claims priority, application Japan, Oct. 7, 1965,
40/82,092
4 Claims. (Cl. 116—114)

ABSTRACT OF THE DISCLOSURE

Device to detect and indicate the presence and absence of film in a camera through a lever arrangement, a portion of which is in the viewing field of the view finder, and wherein an interlock is provided with the film loading lid of the camera.

---

The present invention relates to a device for detecting and indicating the presence or absence of film in cameras and the depletion of the film supply in movie cameras.

The object of the present invention is to provide in the vicinity of the film gate within the camera, a lever arrangement for detecting and indicating the presence or absence of film in a camera, the completion of the film supply, the lever arrangement being such that a slight pressure is exerted on an edge of the film to locate the film in place, the lever arrangement being interlocked with the lid of the film chamber, to simplify film loading and insure the proper loading and unloading of the film chamber.

The present invention will be more fully understood from the following explanation with reference to the annexed drawing, in which:

FIG. 4 is a view similar to FIG. 2, showing the film chamber lid open; while

Figure 1:
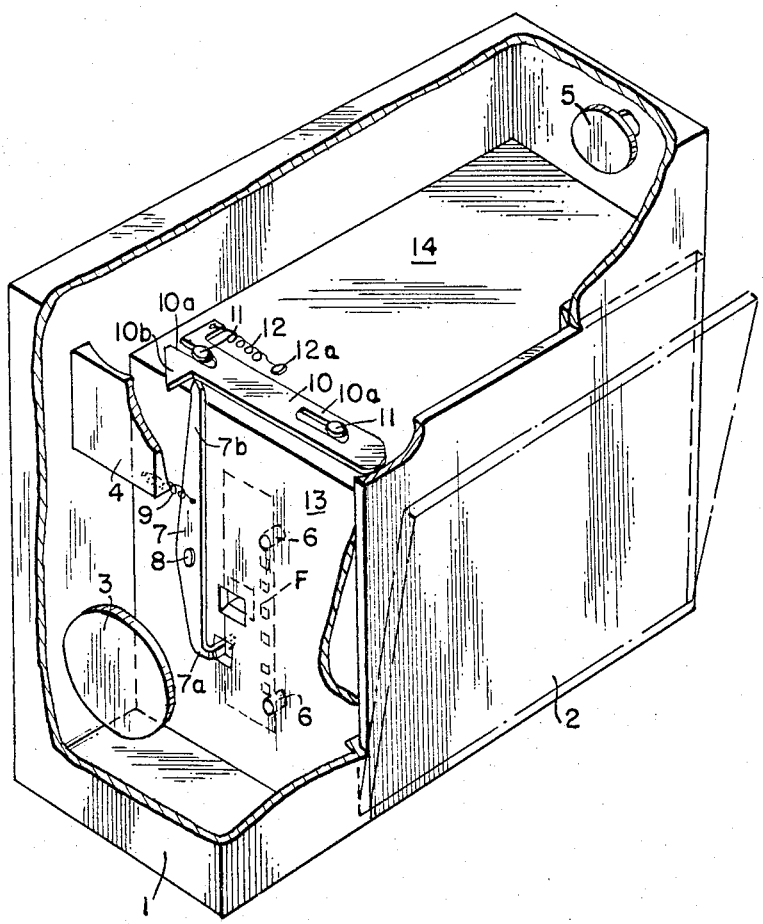
FIG. 1 is a perspective view of a camera, portions of which are broken away to illustrate an embodiment of the invention.

In the drawing, 1 is the casing of movie camera, and 2 is a lid for a film chamber 14 opening out on one side of the camera casing and opening in the direction as is shown by an arrow to the position as shown by the double dotted chain; 3 is the camera lens, and 4 and 5 are the lenses, respectively, of the finder optical system, and F is the film, and 6 are the guide pins secured in an aperture plate 13. 7 is the detecting lever supported rotatably by the shaft 8 fixed in the aperture plate 13, and biased by the spring 9 in the counter clockwise direction. The lever 7 functions both as film presence detector and as a pressure lever, one end thereof being formed with an abutment member 7a for engaging the edge of the film F. With no film in the camera, the spring 9 moves the lower end of the lever 7 into the path of the film. The other end of the lever 7 is in the form of an indicator 7b which extends upwardly into the line of vision of the view finder optical system 4, 5.

Figure 3:
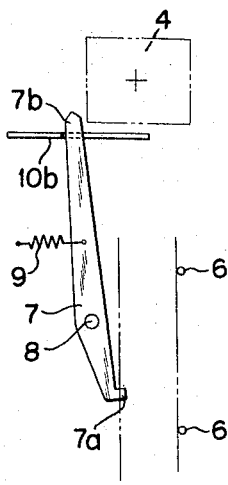
FIG. 3 is a fragmentary portion of FIG. 2 showing the position of the lever arrangement with no film in the camera.
Figure 2:
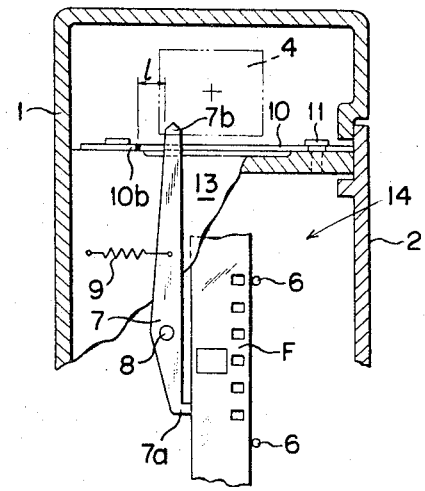
FIG. 2 is a cross-sectional front view of the camera with the film chamber lid closed and illustrating the position of the lever arrangement embodying the invention.

As is shown in FIG. 2, when film F is in the film gate of the camera, the abutment member 7a presses film F in the direction of the guide pins 6 with a predetermined pressure, and at the same time the indicator portion 7b enters the finder view. When film F is not present, as is shown in FIG. 3, the member 7a enters the film path, and the indicator portion 7b moves out of the finder view.

Figure 4:
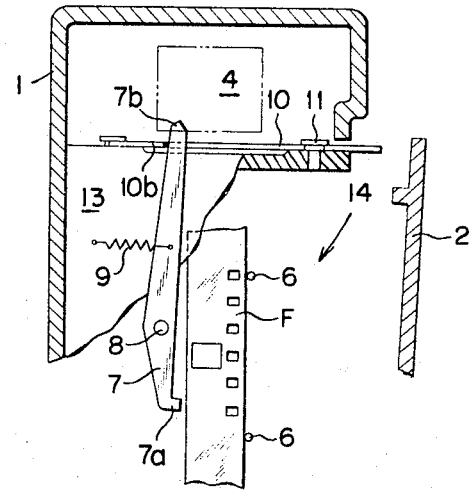

An interlock between the lever 7 and the lid 2 is provided by a slide plate 10 having two grooves 10a slidably received on pins 11 fixed in the upper wall of the film chamber 14. A spring 12 anchored at one end to the top of the film chamber 14 as at 12′, biases the slide plate 10 toward the lid 2 of the film chamber. When the said lid 2 is closed, the slide plate 10 is moved to the left against the pressure of the spring 12 as shown in FIG. 1, and when the lid is opened, the plate 10 is pushed to the right by the spring 12 as shown in FIG. 4.

One end of the slide plate 10 is formed with a hook portion 10a to cooperate with the upper or indicator end 7b of the lever 7. When lid 2 is closed, the slide plate 10 is moved toward the left against the bias of spring 12. It should be noted from FIG. 2 that a spacing "l" is provided between the face of the hook 10a and lever portion 7b when the abutment member 7a engages the edge of the film. As will hereinafter be apparent this spacing or play permits the lever 7 to be pivoted counter-clockwise by the spring 9 when no film is in the film path, or when a film index notch passes under the abutment member 7a. When the lid 2 is opened, the slide member 10 is moved toward the right in FIG. 4 by the spring 12 thereby engaging the hook portion and lever 7 and pivoting the lever 7 clockwise to move the lower end or abutment member 7a out of the film path, whereby the film changing and loading operations can be easily carried out. It is to be noted that the range of the movement of the lever 7, when the lid 2 is closed, should be such that lever 7 can be moved in accordance with the presence or absence of the film F.

In accordance with the present device it is possible to have one and the same lever member work out the operation to detect the presence or absence of film and the function for imparting side pressure to film, and therefore the structure thereof is simplified. In accordance with the present device, the position determining operation of the said member is interlocked with the closing-opening of the lid of the film chamber to make it easy to load film.

Figure 5:
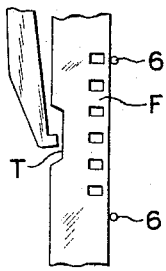
FIG. 5 is a fragmentary view similar to FIG. 3 illustrating the cooperation of the lever arrangement and an indexing notch cut into a film strip.

Also in accordance with the present invention it is possible to know when a film strip or reel has been completely exposed by the provision of a terminating signal in the form of a notch T formed in the edge of the film as shown in FIG. 5 to be engaged by the abutment member 7a of the pivoted lever 7.

It will be readily understood, that the lever arrangement herein illustrated and described may be reversed to provide an indication in the view finder of a camera when the film chamber is empty or when the termination notch T of the film strip passes under the abutment member of the pivoted lever.

What is claimed is:

1. A device for detecting the presence or absence of film in a camera, comprising
   a camera body,
   a film chamber formed in the camera body and having an opening through which film may be loaded,
   a lid pivoted to the film chamber to close the film loading opening,
   an aperture plate forming one wall of the film chamber and providing a film path for film loaded in the film chamber,
   a view finder optical system mounted in the camera body adjacent the film chamber,
   a lever pivotally mounted on the aperture plate adjacent the film path, a first spring anchored at one end to the aperture plate and secured at the other end to the lever for biasing the lever in a first direction, an abutment member at one end of the lever, said abutment member abutting an edge of the film when film is in the film path by the biasing of the lever in the first direction, an indicator at the other end of the lever adapted to be positioned in the view finder field of view when the abutment member abuts the film edge, the indicator being moved out of the field of the view finder when the lever is biased by the first spring in the first direction when no film is in the film path, a slide plate slidably mounted on the film chamber adjacent the aperture plate and cooperating with the pivoted lever and the film chamber lid, a second spring anchored at one end to the film chamber and at the other end to the slide plate to bias the slide plate toward the film chamber lid when closed for abutment therewith, and means on said slide plate to engage the lever when the second spring biases the slide plate in the direction of the lid when the lid is open to pivot the lever in a direction opposite to the first direction against the bias of the first spring to move the abutment member out of the film path.

2. A device according to claim 1, wherein the engaging means on the slide plate comprises a hooked portion to engage the indicator end of the lever.

3. A device according to claim 1, wherein a notch providing a terminating signal for the film is formed in the edge of the film abutted by the abutment member, the lever being biased in the first direction by the first spring moves the indicator out of the view finder field of view when the abutment member registers in the film notch.

4. A device according to claim 2, wherein a notch providing a terminating signal for the film is formed in the edge of the film abutted by the abutment member, the lever being biased in the first direction by the first spring moves the indicator out of the view finder field of view when the abutment member registers in the film notch.

References Cited

UNITED STATES PATENTS

| 1,858,792 | 5/1932 | Merle | 352—171 |
| 2,791,934 | 5/1957 | Barthruff | 352—171 |
| 2,952,195 | 9/1960 | Babcock et al. | 95—42 |
| 3,170,159 | 2/1965 | Goldberg et al. | 352—171 |

FOREIGN PATENTS

| 228,063 | 6/1963 | Austria. |
| 41,707 | 1/1933 | France. |

LOUIS J. CAPOZI, *Primary Examiner.*